United States Patent
Tatara et al.

(10) Patent No.: US 7,914,186 B2
(45) Date of Patent: Mar. 29, 2011

(54) LIGHTING DEVICE FOR VEHICLE

(75) Inventors: Naohisa Tatara, Shizuoka (JP);
Masahiro Kusagaya, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 555 days.

(21) Appl. No.: 11/924,422

(22) Filed: Oct. 25, 2007

(65) Prior Publication Data

US 2008/0112179 A1    May 15, 2008

(30) Foreign Application Priority Data

Nov. 13, 2006   (JP) .................................. 2006-306787

(51) Int. Cl.
- *G01B 5/00* (2006.01)
- *G01B 13/18* (2006.01)
- *G01B 21/22* (2006.01)
- *G01B 21/00* (2006.01)

(52) U.S. Cl. .............. 362/460; 362/39; 362/40; 362/43; 362/53; 362/508; 362/512; 362/523; 362/468

(58) Field of Classification Search .................... 362/36, 362/39, 40, 43, 53, 55, 56, 508, 512, 513, 362/523–532, 545, 294, 460, 465–468
See application file for complete search history.

(56) References Cited

U.S. PATENT DOCUMENTS

| | | | | |
|---|---|---|---|---|
| 4,621,307 | A * | 11/1986 | Weber | 362/528 |
| 4,674,013 | A | 6/1987 | Manzoni | |
| 4,839,785 | A * | 6/1989 | Ohishi | 362/418 |
| 6,543,920 | B2 * | 4/2003 | Fujinami et al. | 362/517 |
| 6,799,876 | B2 | 10/2004 | Ravier | |
| 6,910,789 | B2 | 6/2005 | Tanaka et al. | |
| 2003/0072164 | A1 * | 4/2003 | Watanabe et al. | 362/465 |
| 2003/0169597 | A1 * | 9/2003 | Tanaka et al. | 362/514 |
| 2004/0057243 | A1 * | 3/2004 | Takii et al. | 362/512 |
| 2005/0141234 | A1 | 6/2005 | Tajima et al. | |

FOREIGN PATENT DOCUMENTS

| | | |
|---|---|---|
| JP | 2001-151011 | 6/2001 |
| JP | 2003-054310 | 2/2003 |
| JP | 2003260978 | 9/2003 |

(Continued)

OTHER PUBLICATIONS

Patent Abstracts of Japan for Japanese Patent Application No. 2004-227933, Publication Date: Aug. 12, 2004, 2 pages.

(Continued)

*Primary Examiner* — Sandra L O Shea
*Assistant Examiner* — Danielle Allen
(74) *Attorney, Agent, or Firm* — Osha • Liang LLP

(57) ABSTRACT

A lighting device for a vehicle includes a lamp unit serving to irradiate a light forward, and an actuator having a single output shaft for tilting the lamp unit vertically and transversely. The lamp unit is disposed in a lamp housing formed by a lamp body and a transparent cover for covering a front surface of the lamp body. The lamp unit includes a body coupling portion to be coupled to the lamp body and an actuator coupling portion to be coupled to the actuator. The lamp body includes a lamp unit coupling portion coupled to the body coupling portion and serving to support the lamp unit tiltably in vertical and transverse directions. The actuator is supported on the lamp body and includes an output shaft for tilting the lamp unit vertically and transversely in engagement with the actuator coupling portion of the lamp unit.

7 Claims, 11 Drawing Sheets

FOREIGN PATENT DOCUMENTS

| | | |
|---|---|---|
| JP | 2004-227933 | 8/2004 |
| JP | 2005-186731 | 7/2005 |

OTHER PUBLICATIONS

Notice of Reason of Rejection for related Japanese patent application No. 2006-306787, mailed Dec. 16, 2010, and English translation thereof, 4 pages.

English Abstract from espacenet for patent application with Publication No. JP2005186731, Publication Date: Jul. 14, 2005, 1 page.
English Abstract from espacenet for patent application with Publication No. JP2003054310, Publication Date: Feb. 26, 2003, 1 page.
English Abstract from espacenet for patent application with Publication No. 2003260978, Publication Date: Sep. 16, 2003, 1 page.
English Abstract from espacenet for patent application with Publication No. JP2001151011, Publication Date: Jun. 5, 2001, 1 page.

* cited by examiner

LIGHTING DEVICE FOR VEHICLE

This application claims foreign priority from Japanese Patent Application No. 2006-306787 filed on Nov. 13, 2006, the entire contents of which are hereby incorporated by reference.

BACKGROUND OF THE INVENTION

1. Field of the Invention

The present invention relates to a novel lighting device for a vehicle. More specifically, the invention relates to a technique for simplifying a support of a lamp unit and decreasing the number of components, thereby reducing cost and size.

2. Related Art

Some lighting devices for a vehicle, for example, some headlamps for a car can change an irradiating direction into vertically and transversely optional directions.

In a lighting device for a vehicle described in Patent Document 1, a lamp unit is supported on a bracket transversely tiltable and the bracket is supported on a vertically tiltable lamp body, and the transverse tilt of the lamp unit and the vertical tilt of the bracket are carried out using separate driving devices, respectively.

[Patent Document 1] JP-A-2004-227933 Publication

In the lighting device for a vehicle described in the Patent Document 1, it is necessary to separately provide a driving device for transversely changing an irradiating direction and a driving device for vertically changing the irradiating direction. Moreover, the lamp unit is not directly supported on the lamp body, but is supported on the lamp body through the bracket. For these reasons, the number of components is increased and cost is necessarily increased with an increase in a component cost and an increase in the required man-hours for assembly.

SUMMARY OF THE INVENTION

In one or more embodiments of the present invention, a support of a lamp unit is simplified and the number of components is decreased, thereby reducing cost and size.

In one or more embodiments of the present invention, a lighting device for a vehicle comprises a lamp unit serving to irradiate a light forward, and an actuator for tilting the lamp unit vertically and transversely, wherein the lamp unit is disposed in a lamp housing formed by a lamp body and a transparent cover for covering a front surface of the lamp body, wherein the lamp unit comprises a body coupling portion to be coupled to the lamp body and an actuator coupling portion to be coupled to the actuator, wherein the lamp body comprises a lamp unit coupling portion coupled to the body coupling portion and serving to support the lamp unit tiltably in vertical and transverse directions, and wherein the actuator is supported on the lamp body and comprises a single output shaft for tilting the lamp unit vertically and transversely in engagement with the actuator coupling portion of the lamp unit.

In the lighting device for a vehicle according to one or more embodiments of the invention, accordingly, the lamp unit is directly supported on the lamp body so as to be vertically and transversely tiltable. Therefore, the support structure of the lamp unit can be simplified and the number of components can be decreased so that cost and size can be reduced.

One or more embodiments of the invention provides a lighting device for a vehicle comprising a lamp unit serving to irradiate a light forward, and an actuator for tilting the lamp unit vertically and transversely, wherein the lamp unit is disposed in a lamp housing formed by a lamp body and a transparent cover for covering a front surface of the lamp body, wherein the lamp unit comprises a body coupling portion to be coupled to the lamp body and an actuator coupling portion to be coupled to the actuator, wherein the lamp body comprises a lamp unit coupling portion coupled to the body coupling portion and serving to support the lamp unit tiltably in vertical and transverse directions, and wherein the actuator is supported on the lamp body and comprises a single output shaft for tilting the lamp unit vertically and transversely in engagement with the actuator coupling portion of the lamp unit.

In the lighting device for a vehicle according to one or more embodiments of the invention, accordingly, the lamp unit is directly supported on the lamp body so as to be vertically and transversely tiltable. Therefore, the support structure of the lamp unit can be simplified and the number of components can be decreased so that cost and size can be reduced.

According to a second aspect of one or more embodiments of the invention, a height regulating member is provided between the body coupling portion and the lamp unit and/or between the lamp body and the actuator, and a decorating member is provided between the height regulating member and the transparent cover. Therefore, it is possible to regulate a distance between the lamp body and the lamp unit and to use the same lamp unit in lamp housings having different sizes. Since the height regulating member is hidden by the decorating member, moreover, it can be prevented from being seen through the transparent cover from a forward part. Therefore, it is possible to prevent an appearance from being damaged by the height regulating member.

According to a third aspect of one or more embodiments of the invention, there is provided a guide portion extended in a longitudinal direction and serving to accommodate and hold the lamp unit coupling portion from an opening portion side of the lamp body. Also, in the case in which the lamp housing is small, therefore, the lamp unit can be supported on the lamp body.

According to a fourth aspect of one or more embodiments of the invention, the output shaft is rotatable around a rotation axis extended in a vertical direction and is horizontally movable in a longitudinal direction, and there are provided a rotation driving source for rotating the output shaft, a horizontal driving source for horizontally moving the output shaft, and a driving control portion for controlling driving operations of the rotation driving source and the horizontal driving source in response to a signal on a vehicle side. Irrespective of the simple support structure, therefore, it is possible to tilt the lamp unit in vertical and transverse directions during running and to tilt the lamp unit in the vertical and transverse directions in an initialization.

According to a fifth aspect of one or more embodiments of the invention, the output shaft is rotatable around a rotation axis extended in a vertical direction and is horizontally movable in a longitudinal direction, and there are provided a horizontal driving source for horizontally moving the output shaft, a driving control portion for controlling a driving operation of the horizontal driving source in response to a signal on a vehicle side, and a transverse aiming portion for rotating the output shaft. Irrespective of the simple support structure, therefore, it is possible to tilt the lamp unit in a vertical direction during running and to tilt the lamp unit in the vertical and transverse directions in an initialization.

According to a sixth aspect of one or more embodiments of the invention, the output shaft is rotatable around a rotation axis extended in a vertical direction and is horizontally movable in a longitudinal direction, and there are provided a vertical aiming portion for horizontally moving the output shaft, and a transverse aiming portion for rotating the output shaft. Irrespective of the simple support structure, therefore, it is possible to tilt the lamp unit in vertical and transverse directions in an initialization.

Other aspects and advantages of the invention will be apparent from the following description and the appended claims.

DETAILED DESCRIPTION OF THE EXEMPLARY EMBODIMENTS

The best mode for carrying out the invention will be described below with reference to the accompanying drawings.

In all embodiments which will be described below, embodiments of the invention are applied to a headlamp for a car.

Figure 1:
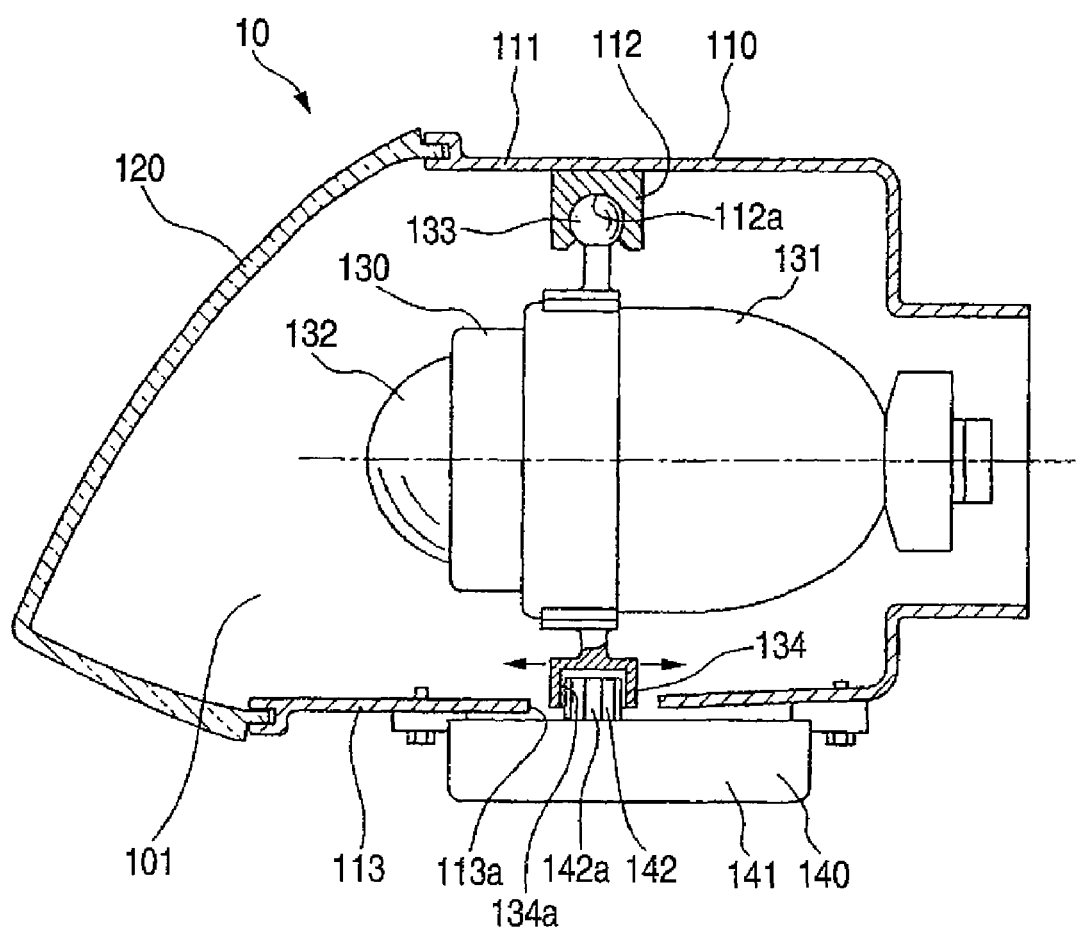
FIG. 1 is a schematic longitudinal sectional view showing a lighting device for a vehicle according to a first embodiment of the invention together with FIGS. 2 to 5.

FIG. 1 shows a schematic of a headlamp for a car according to a first embodiment of the invention.

A headlamp 10 for a car includes a lamp body 110 having a concave portion opened forward, and the front opening of the lamp body 10 is covered with a transparent cover 120 so that a lamp housing 101 is formed. A lamp unit 130 is supported in the lamp housing 101 tiltably in vertical and transverse directions. Furthermore, an actuator 140 for tilting the lamp unit 130 in the transverse direction is disposed in the lamp housing 101.

The lamp unit 130 includes, at least, a reflector 131, a projection lens 132 and a light source which is not shown, and serves to irradiate an illumination light forward. A body coupling portion 133 to be coupled to the lamp body 110 is formed on an upper end of the lamp unit 130, and, furthermore, an actuator coupling portion 134 to be coupled to the actuator is formed on a lower end of the lamp unit 130. In the embodiment shown, the body coupling portion 133 is formed as a sphere constituting a part of a ball joint portion. Moreover, the actuator coupling portion 134 is formed like a thick disk and has a lower surface provided with an opened coupling concave portion 134a, and an engaging groove (not shown) extended in a vertical direction is formed on an inner peripheral surface of the coupling concave portion 134a.

A lamp unit coupling portion 112 is formed on a lower surface of an upper surface portion 111 of the lamp body 110. The lamp unit coupling portion 112 is formed as a ball receiving member constituting a part of the ball joint portion. The ball receiving member 112 has an opened spherical concave portion 112a formed on a lower surface. The sphere (body coupling portion) 133 formed on the lamp unit 130 is internally fitted in the spherical concave portion 112a so that a ball joint is formed therein. When the sphere (body coupling portion) 133 is rotated in the spherical concave portion 112a, the lamp unit 130 can be tilted in the vertical and transverse directions.

The actuator 140 has an output shaft 142 protruded upward from an upper surface of a case 141, and the output shaft 142 is driven by a driving source constituted in the case 141. More specifically, the case 141 includes a horizontal driving source and a rotation driving source, and the output shaft 142 is moved in a longitudinal direction by the horizontal driving source and is rotated around a rotation axis extended in an almost vertical direction by the rotation driving source. Engaging convex bars 142a, 142a, □ extended in an axial direction are formed on an outer peripheral surface of the output shaft 142.

The actuator 140 is fixed to a lower surface of a lower surface portion 113 of the lamp body 110, and the output shaft 142 is inserted through a long inserting hole 113a in a longitudinal direction which is formed on the lower surface portion 113 of the lamp body 110 and is protruded into the lamp housing 101, and is fitted in the coupling concave portion 134 provided on the lower end of the lamp unit 130. The engaging convex bars 142a, 142a, □ formed on the outer peripheral surface of the output shaft 142 are engaged with the engaging grooves (not shown), which are formed on the inner peripheral surface of the coupling concave portion 134 to prevent a slip in a rotating direction between the output shaft 142 and the coupling concave portion 134a.

In the headlamp 10 for a car, when the output shaft 142 is rotated around a rotation axis extended in an almost vertical direction by the rotation driving source of the actuator 140, the actuator coupling portion 134 fitting the output shaft 142 therein receives a rotating force around an axis extended in an almost vertical direction. Accordingly, the lamp unit 130 having the actuator coupling portion 134 formed thereon is rotated in the transverse direction. Consequently, an irradiating direction of the lamp unit 130 is changed in the transverse direction. When the output shaft 142 is moved in the longitudinal direction by the horizontal driving source of the actuator 140, moreover, the actuator coupling portion 134 provided on the lower end is displaced in the longitudinal direction in a state in which a position in the longitudinal direction of the body coupling portion 133 provided on the upper end of the lamp unit 130 is fixed. Therefore, the lamp unit 130 is tilted in the vertical direction. Consequently, the irradiating direction of the lamp unit 130 is changed in the vertical direction.

Accordingly, the horizontal driving source and the rotation driving source are driven by a manual operation at a driver's seat or an automatic operation based on a result of detection obtained by detecting means for detecting a tilt of a car body through various sensors such as an axle sensor for detecting a height of an axle, for example. Consequently, it is possible to change the irradiating direction of the lamp unit 130 in the vertical and transverse directions at any time during running.

In a delivery from a factory or an automobile inspection, moreover, it is possible to carry out an aiming regulation, that is, an initial regulation of a light distribution by driving the horizontal driving source and the rotation driving source while visually observing a pattern to be irradiated on a forward screen or automatically measuring an illuminance at each measuring point on the screen.

Figure 2:
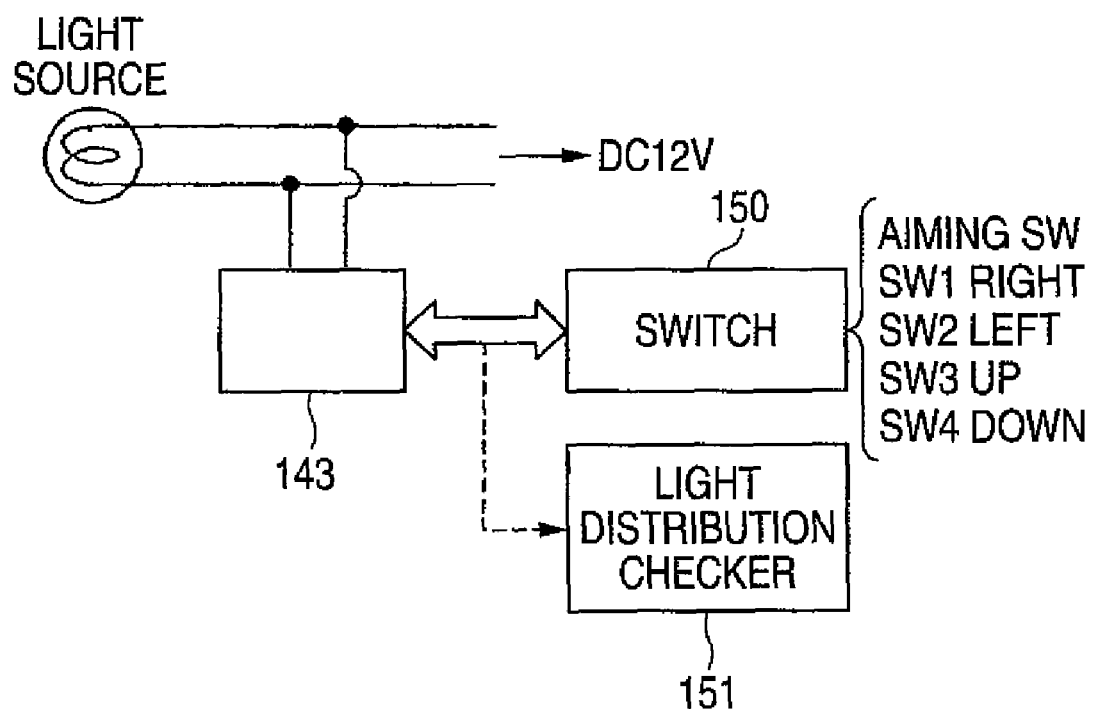
FIG. 2 is a schematic block diagram showing an example in which an aiming jig is used to carry out aiming.

The aiming regulation can be simply carried out using an aiming jig as shown in FIG. 2. An aiming jig 150, as shown in FIG. 2, is a switch element and has switches sw1 to sw4, for example. When the aiming regulation is to be carried out, the aiming jig 150 is connected to a control circuit 143 of the actuator 140. A special terminal for connecting the aiming jig 150 is prepared for the control circuit 143. The lamp unit 130 is tilted at a predetermined angle in a rightward direction when the switch sw1 is turned ON, the lamp unit 130 is tilted at a predetermined angle in a leftward direction when the switch sw2 is turned ON, the lamp unit 130 is tilted at a predetermined angle in an upward direction when the switch sw3 is turned ON, and the lamp unit 130 is tilted at a predetermined angle in a downward direction when the switch sw4 is turned ON, for example. Finally, the lamp unit 130 is brought into an initializing state. By using a light distribution checker 151 for turning ON the lamp unit 130 to irradiate a distributed light on the forward screen and automatically measuring an illuminance at each measuring point on the screen in combination with the aiming jig 150 in the aiming regulation, it is possible to carry out the aiming regulation fully automatically.

While the lamp unit 130 is coupled to the lamp body 110 by means of the ball joint in the embodiment shown, the lamp unit and the lamp body may be coupled to each other by means of a spring material such as a plate spring or a coil spring and the lamp unit may be tiltable in the vertical and transverse directions with respect to the lamp body by setting the coupling point as a fulcrum. Consequently, a coupling structure of the lamp unit to the lamp body can be simpler.

Figure 3:
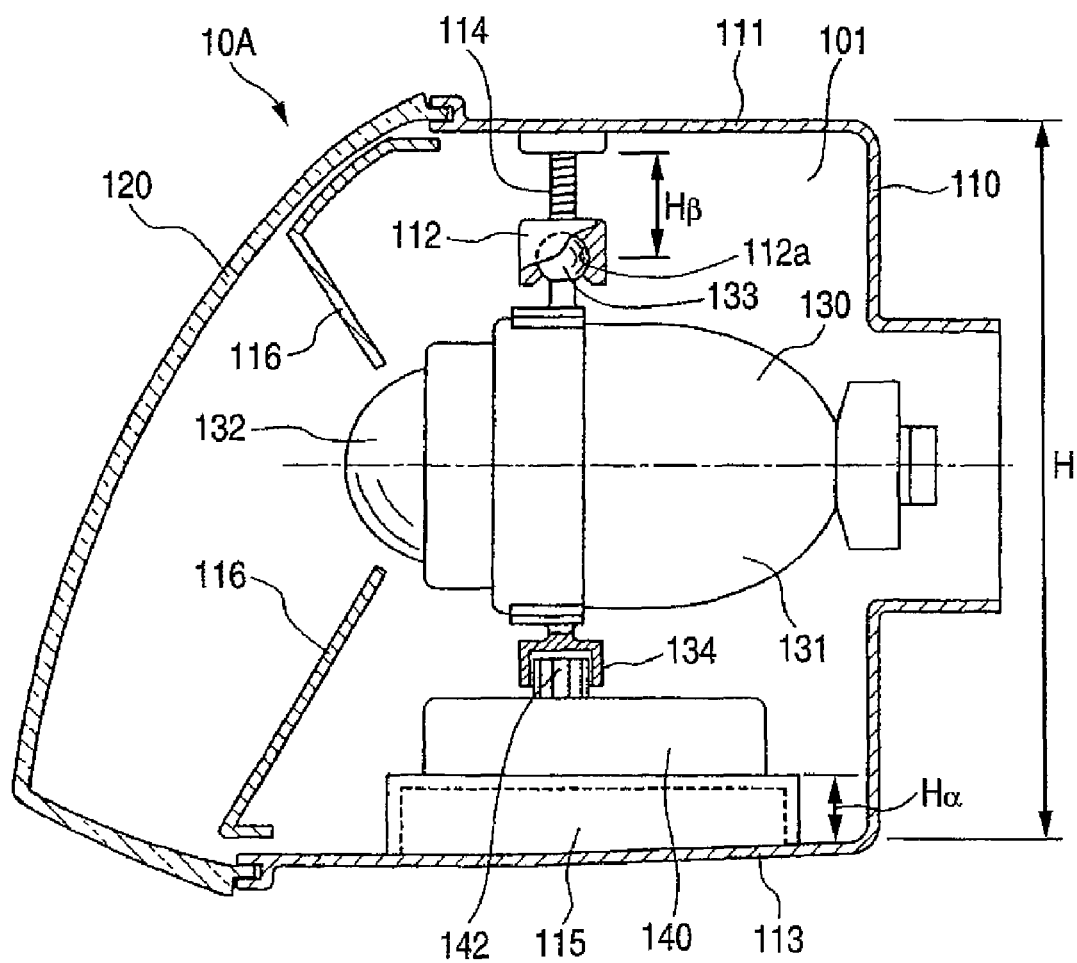
FIG. 3 is a schematic longitudinal sectional view showing a variant in which a height regulating member is provided.

Moreover, it is also possible to provide a height regulating member between the lamp body and the lamp unit and/or between the lamp body and the actuator. FIG. 3 shows an example in which the height regulating member is provided.

In a headlamp 10A for a car according to the variant, a height regulating member 114 is provided between a lamp unit coupling portion 112 and an upper surface portion 111 of a lamp body 110. Furthermore, a height regulating member 115 is provided between a lower surface portion 113 of the lamp body 110 and an actuator 140. The height regulating members 114 and 115 have variable heights Hβ and Hα, respectively.

A body coupling portion (sphere) 133 of a lamp unit 130 is fitted in a spherical concave portion 112a of the lamp unit coupling portion (the sphere receiving member) 112 supported on the upper surface portion 111 of the lamp body 110 through the height regulating member 114. Moreover, an output shaft 142 of the actuator 140 supported on the lower surface portion 113 of the lamp body 110 through the height regulating member 115 is fitted in an actuator coupling portion 134 of the lamp unit 130. Furthermore, a decorating member 116 is disposed between the height regulating members 114 and 115 and a transparent cover 120, and the height regulating members 114 and 115 can be prevented from being seen through the transparent cover 120.

In the headlamp 10A for a car according to the variant, it is possible to use the same lamp unit 130 for lamp housings 101 having different sizes, particularly, different sizes in a vertical direction. In that case, a difference in an interval between the lamp unit 130 and upper and lower surfaces of the lamp housing 101 is adapted by varying the heights Hβ and Hα of the height regulating members 114 and 115. Moreover, it is also possible to dispose a discharge lamp lighting circuit (a ballast) in a lower space of the height regulating member 115.

Figure 4:
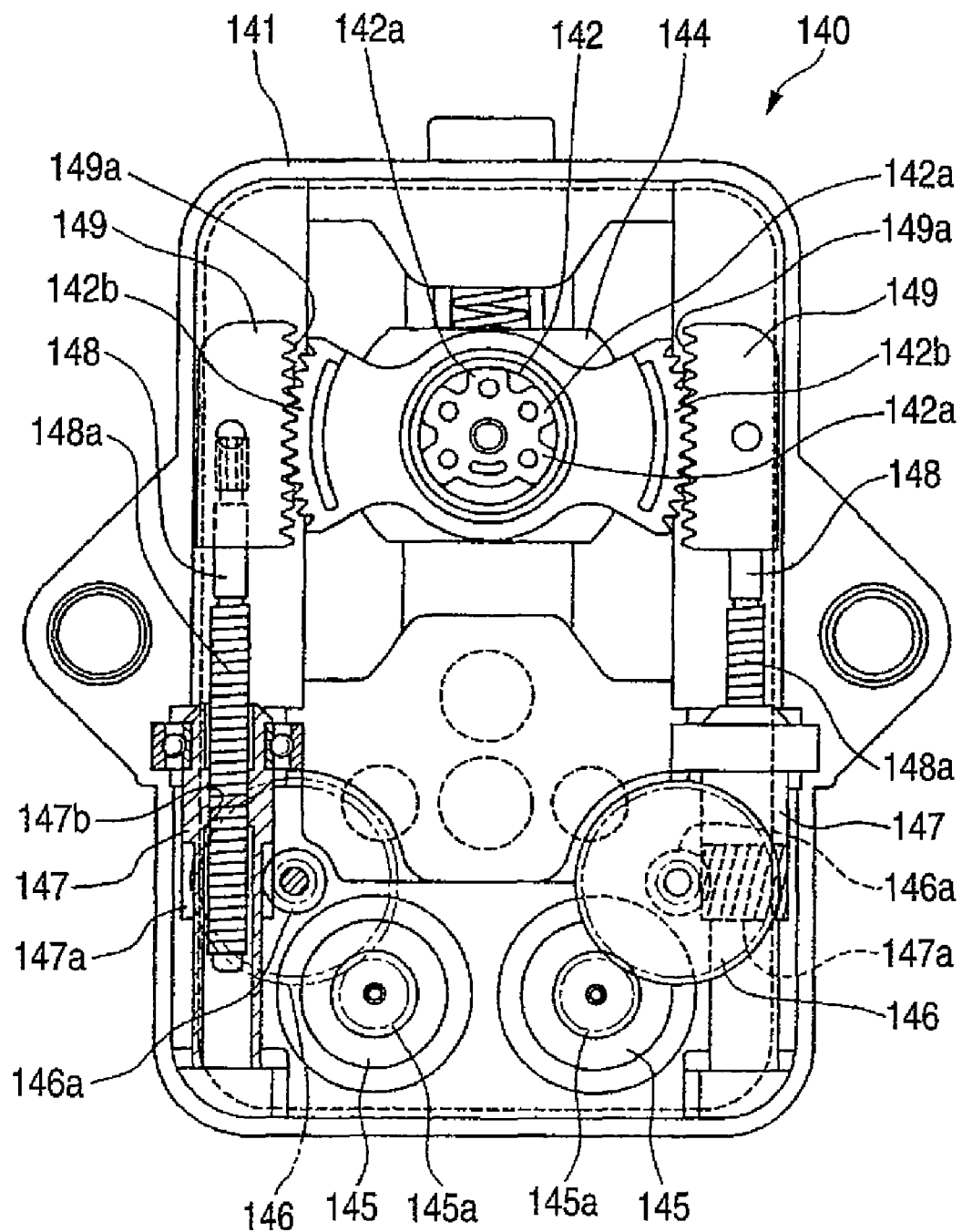
FIG. 4 is a plan view showing an internal structure of an actuator, a part of which is taken away.

Next, the details of the actuator 140 will be described with reference to FIG. 4.

A slider 144 is supported in the case 141 of the actuator 140 movably in a longitudinal direction, and the output shaft 142 is rotatably supported on the slider 144. The output shaft 142 is provided with sector gear portions 142b and 142b which are protruded in a transverse direction.

Two motors 145 and 145 are disposed in the case 141, and worm gears 146a and 146a are formed integrally with transmission gears 146 and 146 to be rotated by driving gears 145a and 145a of the motors 145 and 145.

Furthermore, cylindrical gears 147 and 147 are rotatably supported in the case 141, and bevel gears 147a and 147a are formed on outer peripheral surfaces of the cylindrical gears 147 and 147. Moreover, screw grooves 147b and 147b are formed on central holes of the cylindrical gears 147 and 147. The worm gears 146a and 146a of the transmission gears 146 and 146 are mated with the bevel gears 147a and 147a of the cylindrical gears 147 and 147. When the motors 145 and 145 are rotated, accordingly, the cylindrical gears 147 and 147 are rotated.

Screw shaft portions 148a and 148a of transmitting members 148 and 148 having portions excluding front end portions as the screw shaft portions 148a and 148a are screwed into the screw grooves 147b and 147b of the cylindrical gears 147 and 147. When the cylindrical gears 147 and 147 are rotated, accordingly, the screw shaft portions 148a and 148a are fed by the screw grooves 147b and 147b. Therefore, the transmitting members 148 and 148 are moved in a longitudinal direction.

The front ends of the transmitting members 148 and 148 are fixed to rack members 149 and 149. Rack teeth 149a and 149a formed on the rack members 149 and 149 are mated with the sector gear portions 142b and 142b of the output shaft 142.

In the actuator 140, in the case in which the two motors 145 and 145 are driven in opposite directions to each other when the output shaft 142 is to be rotated, one of the rack members 149 is moved forward and the other rack member 149 is moved rearward. Therefore, the output shaft 142 is rotated. When the two motors 145 and 145 are driven in the same direction, moreover, the two rack members 149 and 149 are moved in the same direction. Therefore, the output shaft 142 is moved forward or rearward.

Figure 5:
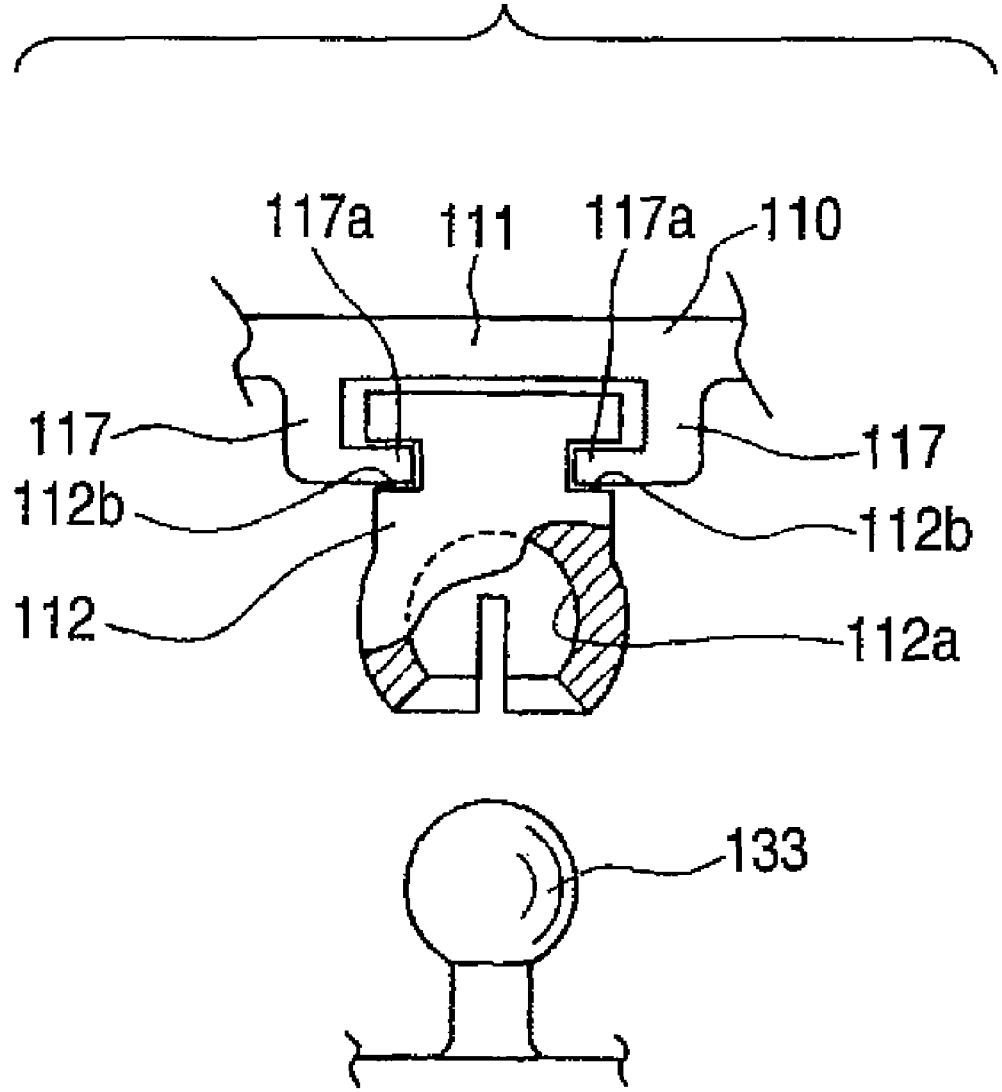
FIG. 5 is a schematic front view showing a variant of a lamp unit coupling portion of a lamp body in a separating state from a body coupling portion of the lamp unit.
Figure 6:
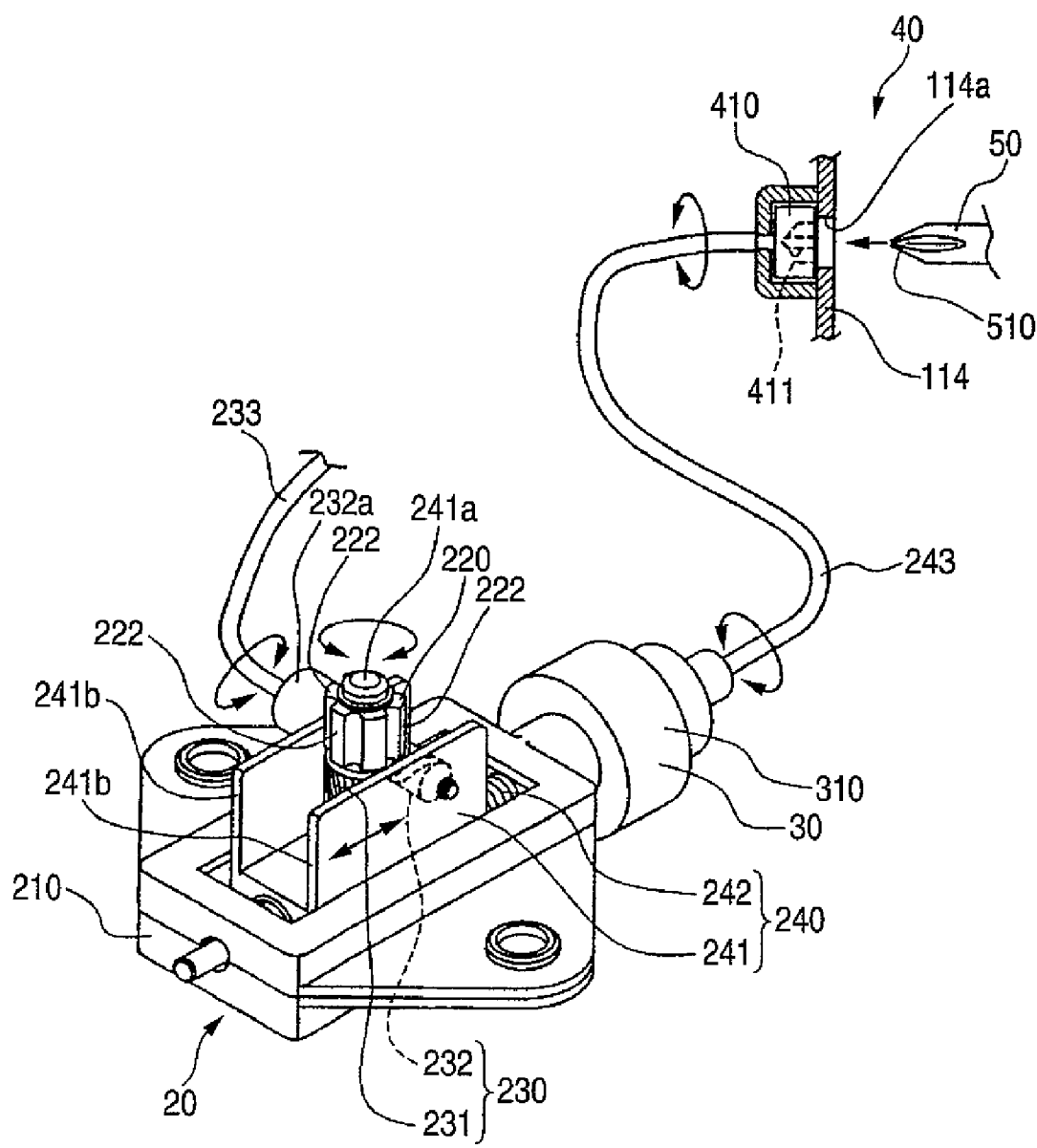
FIG. 6 is a schematic perspective view showing a second embodiment of the actuator together with FIGS. 7 to 9.
Figure 7:
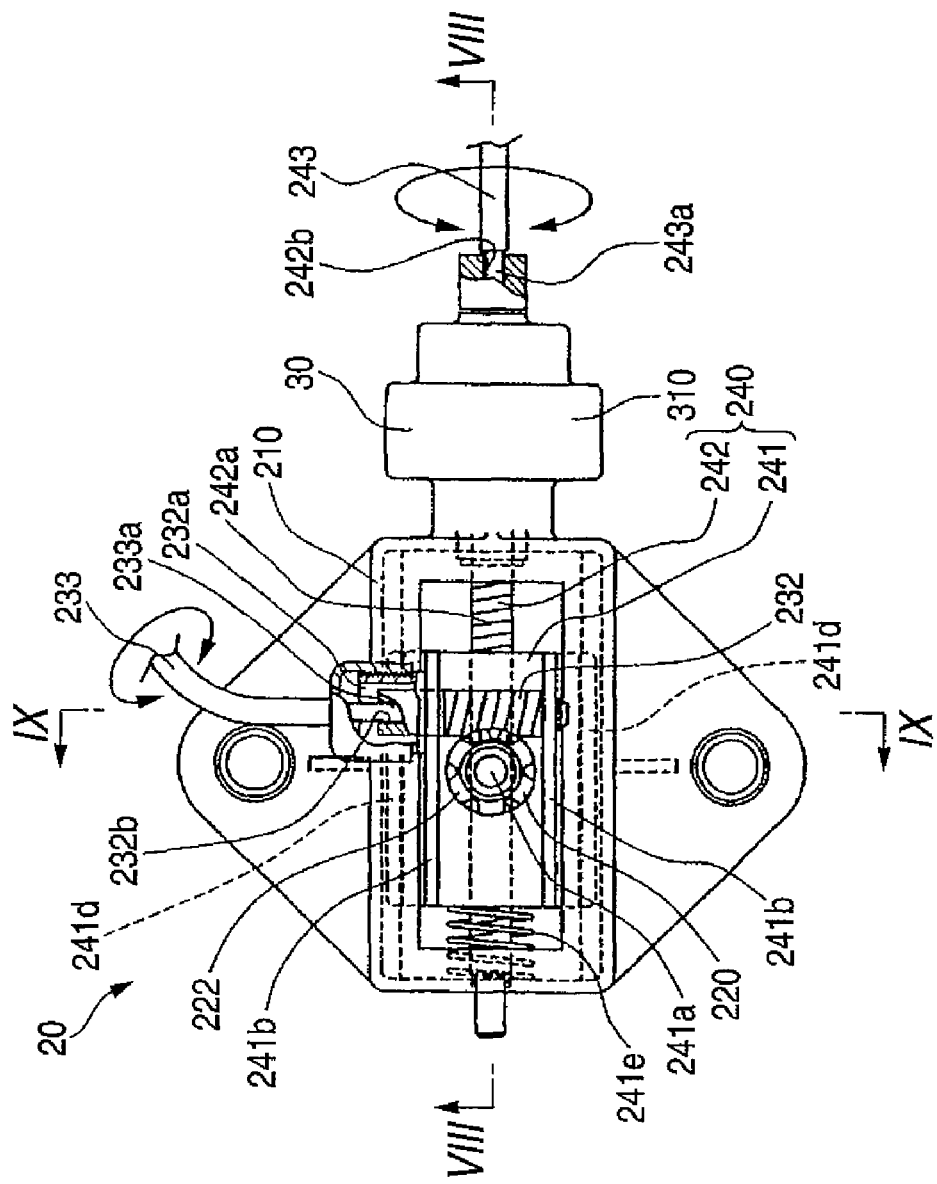
FIG. 7 is a schematic plan view.
Figure 8:
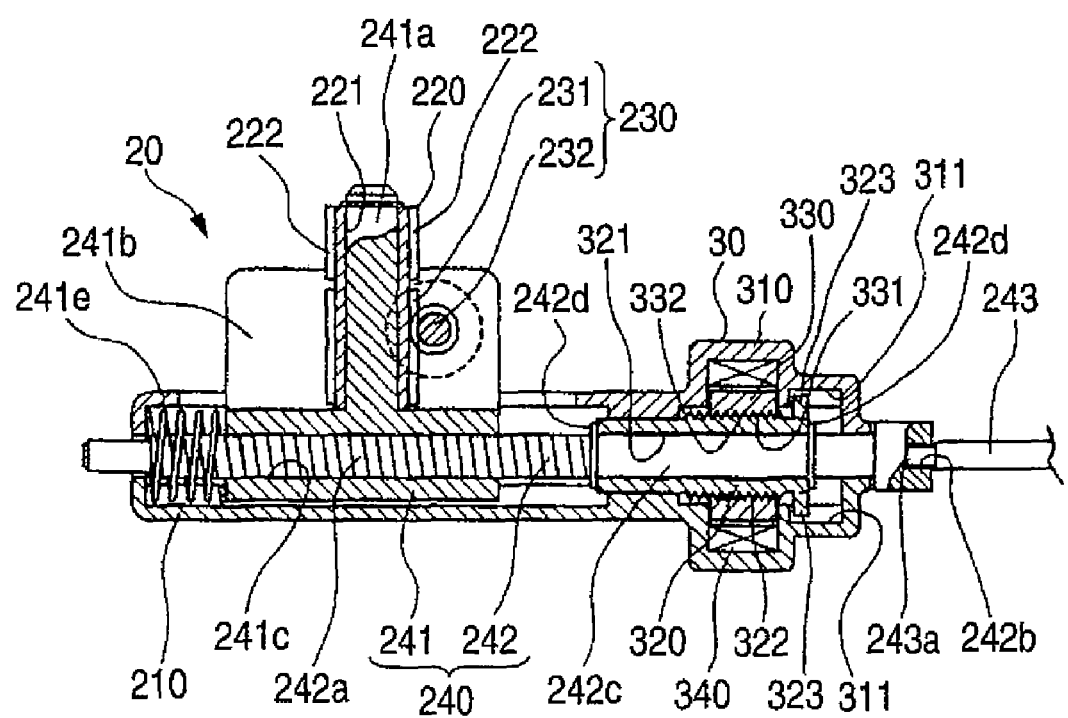
FIG. 8 is a sectional view taken along a VIII-VIII line of FIG. 7.
Figure 9:
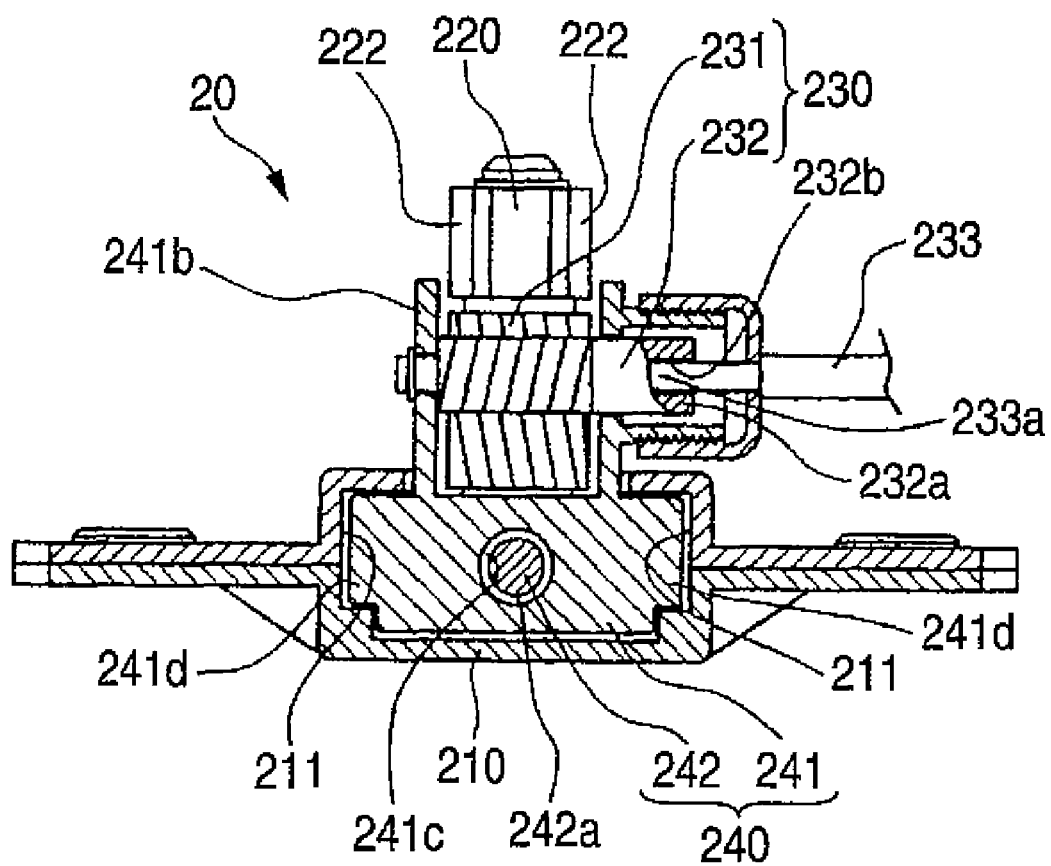
FIG. 9 is a sectional view taken along a IX-IX line of FIG. 7.

FIG. 5 shows a variant related to an attachment of the lamp unit coupling portion provided in the lamp body 110. The lower surface of the upper surface portion 111 of the lamp body 110 is provided with two rail members 117 and 117 which are formed as guide portions extended in a longitudinal direction in parallel with each other, and engaging edges 117a and 117a protruded in mutual directions are formed on lower edges of the rail members 117 and 117. Moreover, both side surfaces of an upper part of the lamp unit coupling portion (sphere receiving member) 112 are provided with engaging grooves 112b and 112b extended in a longitudinal direction. The engaging edges 117a and 117a of the rail members 117 and 117 are slidably engaged with the engaging grooves 112b and 112b of the lamp unit coupling portion 112.

As described above, the body coupling portion (sphere) 133 of the lamp unit 130 is fitted in the spherical concave portion 112a of the lamp unit coupling portion 112 supported on the lamp body 110 through the rail members 117 and 117, and the upper end of the lamp unit 130 is supported on the upper surface portion 111 of the lamp body 110 tiltably in vertical and transverse directions through a ball joint thus formed.

In the variant shown in FIG. 5, the lamp unit can be supported on the lamp body also in the case in which the lamp housing is small.

FIGS. 6 to 9 show a second embodiment of the actuator.

An actuator 20 has an output shaft 220 protruded upward from a case 210, and the output shaft 220 is rotated around an axis extended in an almost vertical direction and is provided movably in a longitudinal direction. A rotation driving mechanism 230 for rotating the output shaft 220 around an axis extended in an almost vertical direction and a horizontal driving mechanism 240 for moving the output shaft 220 in the longitudinal direction are constituted in the case 210.

The output shaft 220 takes an almost cylindrical shape and has a central hole 221 penetrating through a center. Moreover, engaging convex bars 222, 222, . . . extended in an axial direction are protruded from an almost upper half part of an outer peripheral surface of the output shaft 220. Moreover, a gear tooth is formed in an almost lower half part of the outer peripheral surface of the output shaft 220 and is set to be a wheel gear portion 231.

A slider 241 is provided in the case 210 movably in a longitudinal direction. The slider 241 is provided with a support shaft 241a protruded upward from an almost center and support walls 241b and 241b extended and formed in a longitudinal direction in a position placed slightly apart from the support shaft 241a in a transverse direction. Moreover, a screw hole 241c is formed to penetrate in a longitudinal direction. In the slider 240, engaging projection pieces 241d and 241d protruded from left and right side surfaces of the slider 240 are slidably engaged with guide grooves 211 and 211 extended and formed on left and right internal side surfaces of the case 210 in the longitudinal direction. Consequently, the slider 240 is supported movably in the longitudinal direction in the case 210.

The support shaft 241a of the slider 241 is inserted through the central hole 221 so that the output shaft 220 is rotatably supported on the slider 241.

A worm gear 232 is rotatably supported between the support walls 241b and 241b of the slider 241, and the worm gear 232 is mated with the wheel gear portion 231 of the output shaft 220. When the worm gear 232 is rotated, accordingly, the output shaft 220 is rotated. The worm gear 232 is provided with a coupling portion 232a protruded outward from one of the support walls 241b and 241b, and a coupling hole 232b opened to an end face and having a rectangular section is formed on the coupling portion 232a. The rotation driving mechanism 230 is constituted by the worm gear 232 and the wheel gear portion 231 formed on the output shaft 220.

A horizontal driving shaft 242 is provided to longitudinally penetrate through the case 210, and a screw bar 242a formed on an outer peripheral surface of the horizontal driving shaft 242 is screwed into the screw hole 241c of the slider 241. Accordingly, the screw hole 241c of the slider 241 is fed through the screw bar 242a of the horizontal driving shaft 242 by a rotation of the horizontal driving shaft 242 and the horizontal driving shaft 242 is moved in a longitudinal direction with respect to the case 210 so that the slider 241 is moved in the longitudinal direction with respect to the case 210. Therefore, the output shaft 220 supported on the slider 241 is moved in the longitudinal direction with respect to the case 210. The horizontal driving mechanism 240 is constituted by the horizontal driving shaft 242 and the slider 241. A compression coil spring 241e is inserted between the slider 241 and an internal surface of a front end of the case 210, and a looseness of the slider 241 can be thus prevented.

The horizontal driving shaft 242 is rotated and longitudinally moved as a driving shaft of a leveling driving portion 30 coupled to a rear end of the actuator 20.

The leveling driving portion 30 is set into such a state that a case 310 thereof is coupled integrally with a rear end of the case 210 of the actuator 20.

The screw bar 242a is formed to be a screw shaft in a portion placed in a tip portion of the horizontal driving shaft 242, that is, the case 210 of the actuator 20, and a rear end is set to be a coupling portion and a coupling hole 242b opened to the rear end and having an almost rectangular section is formed. Moreover, an intermediate portion 242c provided between the screw shaft portion and the rear end is set to be a supported portion taking a shape of a round bar.

The case 310 includes a cylindrical member 320, a rotor 330 and a stator 340 which are disposed concentrically around the horizontal driving shaft 242.

The cylindrical member 320 provided rotatably in the case 310 wholly takes an almost cylindrical shape and has a central hole 321, and has a screw bar 322 formed in a central part of an outer peripheral surface thereof, and furthermore, detent projections 323 and 323 protruded vertically are formed integrally with a rear end.

The horizontal driving shaft 242 is inserted into the central hole 321 of the cylindrical member 320 from a rear part thereof, and furthermore, washers 242d and 242d are externally fitted in a portion of the horizontal driving shaft 242 which is longitudinally protruded from the cylindrical member 320 so as to abut on the cylindrical member 320. Consequently, the horizontal driving shaft 242 is supported rotatably with respect to the cylindrical member 320 and immovably in an axial direction thereof.

The rotor 330 also takes an almost cylindrical shape as a whole, and a screw groove 332 is formed on a central hole 331 having an almost equal inside diameter to an outside diameter of the cylindrical member 320. A plurality of permanent magnets (not shown) is attached as rotor magnets to an outer peripheral portion of the rotor 330.

The stator 340 has a plurality of stator coils (not shown) corresponding to the rotor magnets and is disposed along an internal peripheral surface of the case 310.

The cylindrical member 320 supporting the horizontal driving shaft 242 as described above is set into such a state that the cylindrical member 320 is inserted into the central hole 331 of the rotor 330 from a rear part thereof to screw the screw bar 322 into the screw groove 332. The horizontal driving shaft 242, the cylindrical member 320 and the rotor 330 are disposed in predetermined portions in the case 310. At this time, the detent projections 323 and 323 of the cylindrical member 320 are slidably positioned in engaging concave portions 311 and 311 formed to be extended longitudinally in the case 310.

In the horizontal driving shaft 242, the screw bar 242a is screwed into the screw hole 241c of the slider 241 in the actuator 20.

A tip portion 243a having an almost rectangular section of a flexible wire 243 is fitted and fixed into the coupling hole 242b of the horizontal driving shaft 242. Moreover, a tip portion 233a having an almost rectangular section of a flexible wire 233 is fitted and fixed into the coupling hole 232b of the worm gear 232 in the rotation driving mechanism 230. A rear end of the flexible wire 243 is coupled to an aiming operating portion 40 shown in FIG. 6. The aiming operating portion 40 is coupled to an operating member 410 supported rotatably on a rear surface wall 114 of a lamp body, for example. A cross groove 411 is formed on a rear surface of the operating member 410 and is caused to face rearward from a facing hole 114a formed on the rear surface wall 114 of the lamp body. Therefore, when a tip portion 510 of a plus driver 50 is engaged with the cross groove 411 of the operating member 410 to rotate the plus driver 50, for example, the operating member 410 is rotated, and furthermore, the rotation of the operating member 410 is transmitted to the horizontal driving shaft 242 through the flexible wire 243. Consequently, the slider 241 of the actuator 20 is moved in a longitudinal direction. More specifically, the output shaft 220 is moved in the longitudinal direction. A rear end of the flexible wire 233 fitted and fixed into the coupling hole 232b of the worm gear 232 in the rotation driving mechanism 230 is also connected to the same aiming operating portion (not shown) as the aiming operating portion 40. When the flexible wire 233 is rotated, accordingly, the worm gear 232 is rotated so that the output shaft 220 is rotated.

In a leveling regulation, that is, an execution of a vertical change in an irradiating direction in the middle of running, moreover, when a stepping motor constituted by the rotor 330 and the stator 340 is operated so that the rotor 330 is rotated, the cylindrical member 320 screwed thereinto is prevented from being rotated by the engagement of the detent projections 323 and 323 with the engaging concave portions 311 and 311 and is moved forward or rearward corresponding to a rotating direction of the rotor 330. At this time, the horizontal driving shaft 242 integrated with the cylindrical member 320 is also moved integrally with the cylindrical member 320 in a longitudinal direction. Accordingly, the slider 241 of the actuator 20 is moved in the longitudinal direction.

When the output shaft 220 of the actuator 20 is coupled to an actuator coupling portion 134 of a lamp unit 130, therefore, the lamp unit 130 is tilted in a transverse direction by the driving operation of the rotation driving mechanism 230 and the lamp unit 130 is tilted in a vertical direction by the driving operation of the horizontal driving mechanism 240.

Figure 10:
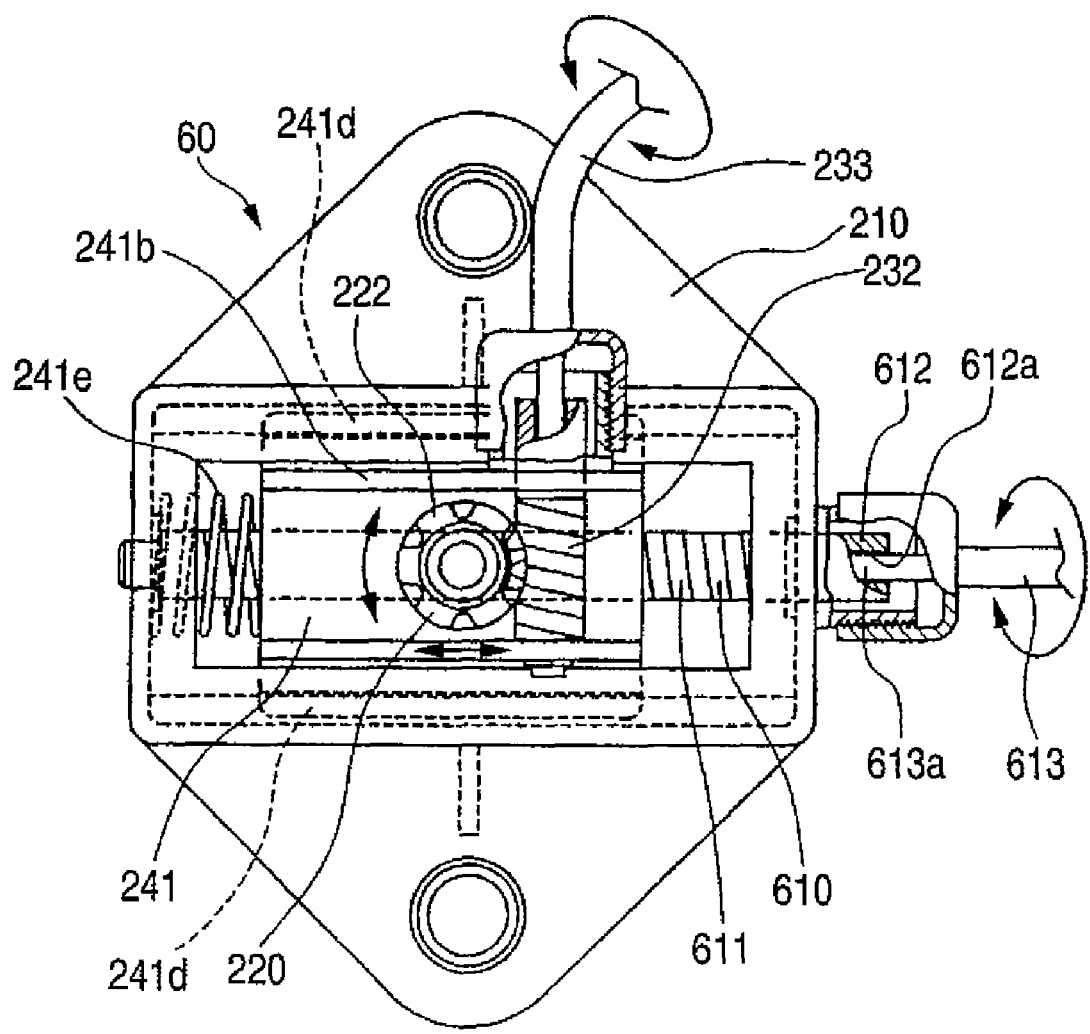
FIG. 10 is a schematic plan view showing a third embodiment of the actuator.

FIG. 10 shows a third embodiment of the actuator.

An actuator 60 according to the third embodiment is different from the actuator 20 according to the second embodiment in that a leveling driving portion 30 is not provided. More specifically, in the actuator 60, a horizontal driving shaft 610 and a support structure thereof are different from the horizontal driving shaft 242 of the actuator 20 and the other portions are the same as in the actuator 20. Accordingly, only the difference will be described in detail, and the other portions have the same reference numerals as those in the actuator 20 and description will be omitted.

The horizontal driving shaft 610 is constituted by a screw shaft portion 611 having a screw bar formed on an outer peripheral surface and a coupling portion 612 formed integrally with a rear end of the screw shaft portion 611. The coupling portion 612 is provided with a coupling hole 612a having a rectangular section. The horizontal driving shaft 610 is supported on a case 210 in such a manner that it can be rotated in a direction extended in a longitudinal direction and a movement in the longitudinal direction is disabled. The coupling hole 612a of the coupling portion 612 is caused to face rearward and a tip portion 613a having a rectangular section in a flexible wire 613 to be rotated from an outside is fitted and fixed into the coupling hole 612a.

When the flexible wire 613 is operated by an operating portion such as the aiming operating portion 40 and is thus rotated from an outside, accordingly, the horizontal driving shaft 610 coupled thereto is rotated so that a slider 241 is moved in the longitudinal direction along the horizontal driving shaft 610 and an output shaft 220 supported on the slider 241 is moved in the longitudinal direction. By the movement in the longitudinal direction of the output shaft 220, a lamp unit is tilted vertically.

Figure 11:
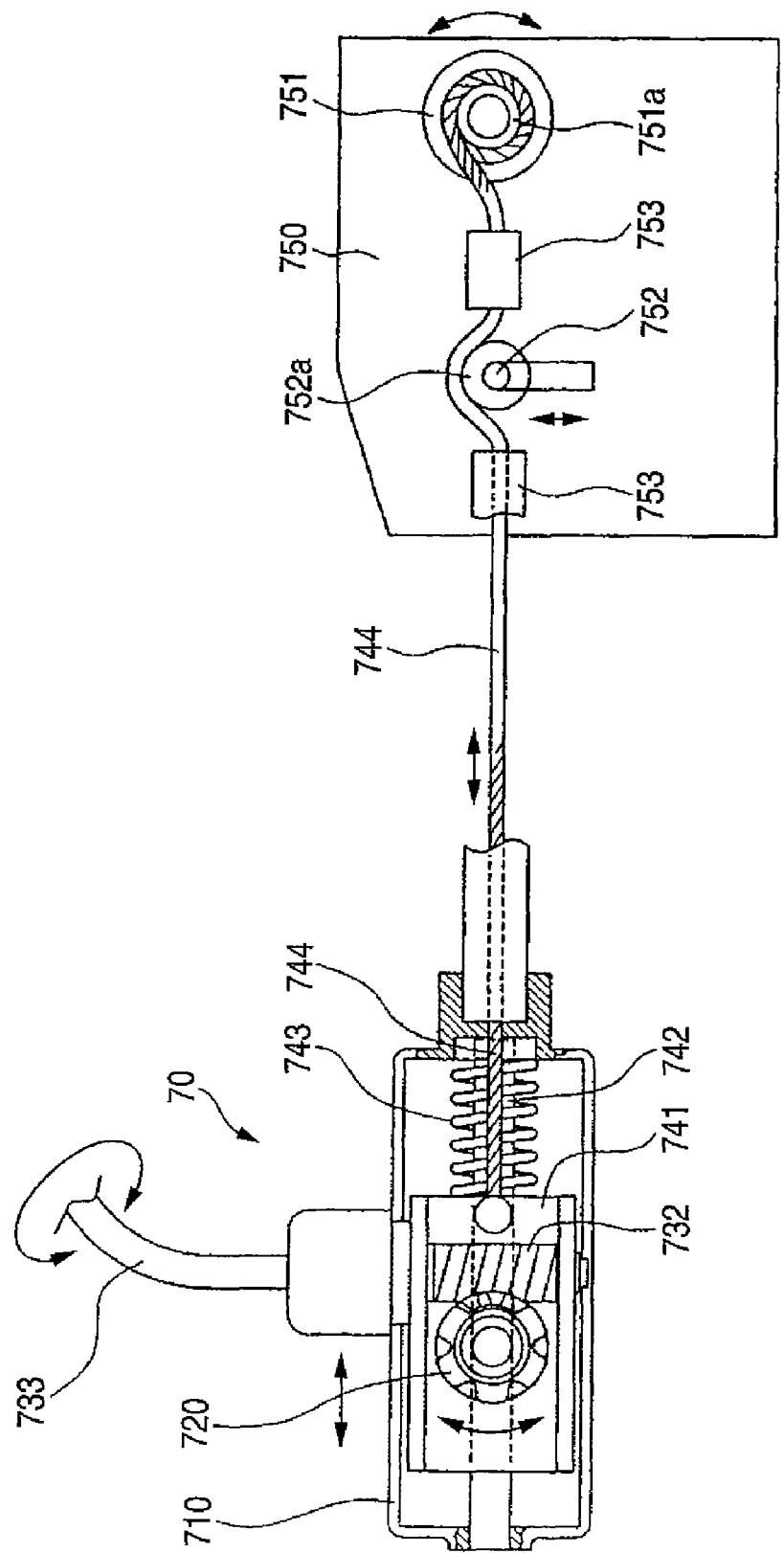
FIG. 11 is a schematic plan view showing a fourth embodiment of the actuator.

FIG. 11 shows a fourth embodiment of the actuator.

In an actuator 70 according to the fourth embodiment, a mechanism for moving a slider 741 in a longitudinal direction is different from that in each of the actuators 20 and 60.

The slider 741 is supported movably in the longitudinal direction in a case 710. A guide shaft 742 is supported on the case 710 so as to be extended in the longitudinal direction, and the slider 741 is supported on the guide shaft 742 movably in the longitudinal direction. A compression coil spring 743 is inserted between an internal surface of a rear end of the case 710 and the slider 741. The slider 741 is energized forward by the compression coil spring 743.

An output shaft 720 is rotatably supported on the slider 741 and a worm gear 732 supported rotatably on the slider 741 is mated with a wheel gear (not shown) formed on the output shaft 720, and the output shaft 720 is rotated by a rotation of the worm gear 732. A flexible wire 733 is coupled to the worm gear 732. When the flexible wire 733 is operated from an outside and is thus rotated, the worm gear 732 is rotated.

An operating portion 750 disposed in a driver's seat is provided with a rotatable vertical driving dial 751 and an aiming operating member 752. A tip portion of an operating wire 744 is coupled to a rear end of the slider 741, and a rear end of the operating wire 744 is wound upon a drum portion 751a of the vertical driving dial 751 of the operating portion 750. The aiming operating member 752 has a pulley 752a, and the pulley 752a comes in contact with the operating wire 744 between two guide pipes 753 and 753 provided in the operating portion 750.

When the vertical driving dial 751 is rotated in a winding direction, therefore, the operating wire 744 is loosened. Accordingly, the slider 741 is moved forward by the energizing force of the compression coil spring 743. To the contrary, when the vertical driving dial 751 is rotated in a winding direction, the operating wire 744 is wound upon the drum portion 751a of the vertical driving dial 751. Therefore, the slider 741 is moved rearward with a compression of the compression coil spring 743. By rotating the vertical driving dial 751, accordingly, it is possible to carry out a change in a vertical direction of an irradiating direction during running, that is, leveling. By moving the aiming operating member 752 in a direction of an arrow in initial aiming, moreover, it is possible to change a path for the operating wire between the two guide pipes 753 and 753. Consequently, it is possible to adjust a position in a longitudinal direction of the slider 741, thereby carrying out the initial aiming.

While description has been made in connection with an exemplary embodiment of the present invention, it will be obvious to those skilled in the art that various changes and modification may be made there in without departing from the present invention. It is aimed, therefore, to cover in the appended claims all such changes and modifications falling within the true spirit and scope of the present invention.

DESCRIPTION OF THE REFERENCE NUMERALS AND SIGNS

10 . . . headlamp for car (lighting device for vehicle), 10A . . . headlamp for car (lighting device for vehicle), 101 . . . lamp housing, 112 . . . lamp unit coupling portion, 114 . . . height regulating member, 115 . . . height regulating member, 116 . . . decorating member, 117 . . . rail member (guide portion), 120 . . . transparent cover, 130 . . . lamp unit, 133 . . . body coupling portion, 134 . . . actuator coupling portion, 140 . . . actuator, 142 . . . output shaft, 145 . . . motor (rotation driving source, horizontal driving source), 20 . . . actuator, 220 . . . output shaft, 60 . . . actuator, 70 . . . actuator, 720 . . . output shaft.

What is claimed is:

1. A lighting device for a vehicle comprising:
   a lamp unit serving to irradiate a light forward; and
   an actuator for tilting the lamp unit vertically and transversely,
   wherein the lamp unit is disposed in a lamp housing formed by a lamp body and a transparent cover for covering a front surface of the lamp body,
   wherein the lamp unit comprises a body coupling portion to be coupled to the lamp body and an actuator coupling portion to be coupled to the actuator,
   wherein the lamp body comprises a lamp unit coupling portion coupled to the body coupling portion and serving to support the lamp unit tiltably in vertical and transverse directions, and
   wherein the actuator is supported on the lamp body and comprises a single output shaft for tilting the lamp unit vertically and transversely in engagement with the actuator coupling portion of the lamp unit.

2. The lighting device for a vehicle according to claim 1, further comprising:
   a height regulating member disposed between the body coupling portion and the lamp unit or between the lamp body and the actuator, and
   a decorating member disposed between the height regulating member and the transparent cover.

3. The lighting device for a vehicle according to claim 1, further comprising:
   a guide portion extended in a longitudinal direction and serving to accommodate and hold the lamp unit coupling portion from an opening portion side of the lamp body.

4. The lighting device for a vehicle according to claim 1,
   wherein the output shaft is rotatable around a rotation axis extended in a vertical direction and is horizontally movable in a longitudinal direction,
   the lighting device further comprising:
      a rotation driving source for rotating the output shaft;
      a horizontal driving source for horizontally moving the output shaft; and
      a driving control portion for controlling driving operations of the rotation driving source and the horizontal driving source in response to a vehicle side signal.

5. The lighting device for a vehicle according to claim 1,
   wherein the output shaft is rotatable around a rotation axis extended in a vertical direction and is horizontally movable in a longitudinal direction,
   the lighting device further comprising:
      a horizontal driving source for horizontally moving the output shaft;
      a driving control portion for controlling a driving operation of the horizontal driving source in response to a vehicle side signal; and
      a transverse aiming portion for rotating the output shaft.

6. The lighting device for a vehicle according to claim 1,
   wherein the output shaft is rotatable around a rotation axis extended in a vertical direction and is horizontally movable in a longitudinal direction,
   the lighting device further comprising:
      a vertical aiming portion for horizontally moving the output shaft; and
      a transverse aiming portion for rotating the output shaft.

7. The lighting device for a vehicle according to claim 2, further comprising:
   a guide portion extended in a longitudinal direction and serving to accommodate and hold the lamp unit coupling portion from an opening portion side of the lamp body.

* * * * *